US012696023B2

(12) United States Patent
Luo et al.

(10) Patent No.: US 12,696,023 B2
(45) Date of Patent: Jul. 28, 2026

(54) MICROPHONE ADJUSTMENT APPARATUS AND RECORDING STRUCTURE

(71) Applicant: TILTA INC., Burbank, CA (US)

(72) Inventors: Yaolong Luo, Shenzhen (CN);
Wenping Zeng, Shenzhen (CN);
Kefeng Zhou, Shenzhen (CN); Jared Cohn, Los Angeles, CA (US)

(73) Assignee: TILTA INC., Burbank, CA (US)

( * ) Notice: Subject to any disclaimer, the term of this patent is extended or adjusted under 35 U.S.C. 154(b) by 237 days.

(21) Appl. No.: 18/227,766

(22) Filed: Jul. 28, 2023

(65) Prior Publication Data

US 2024/0406608 A1 Dec. 5, 2024

(30) Foreign Application Priority Data

Jun. 1, 2023 (CN) .......................... 202321382488.X

(51) Int. Cl.
*H04R 1/08* (2006.01)
*F16M 11/20* (2006.01)
*G06F 3/16* (2006.01)
*H04R 1/32* (2006.01)

(52) U.S. Cl.
CPC ........... *H04R 1/08* (2013.01); *F16M 11/2028* (2013.01); *G06F 3/162* (2013.01); *H04R 1/326* (2013.01)

(58) Field of Classification Search
CPC ...... H04R 1/08; H04R 1/326; F16M 11/2028; F16M 11/2007
See application file for complete search history.

(56) References Cited

U.S. PATENT DOCUMENTS

| | | | | |
|---|---|---|---|---|
| 5,454,042 A | * | 9/1995 | Drever ................... | F16M 11/10 |
| | | | | 381/361 |
| 11,293,586 B1 | * | 4/2022 | Kallas .................... | F16M 11/28 |
| 2009/0008213 A1 | * | 1/2009 | Tims ..................... | F16B 7/1427 |
| | | | | 403/109.5 |
| 2013/0161454 A1 | * | 6/2013 | Matsuoka ............ | F16M 11/105 |
| | | | | 248/122.1 |

FOREIGN PATENT DOCUMENTS

CN 208386858 U 1/2019

* cited by examiner

*Primary Examiner* — Fan S Tsang
*Assistant Examiner* — Tyler Michael Liebgott
(74) *Attorney, Agent, or Firm* — LOZA & LOZA, LLP; Derek W. Yeung

(57) ABSTRACT

A microphone adjustment apparatus includes a support rod on which a mounting position is provided for the installation of a microphone and an adjusting rod. The microphone adjustment apparatus also includes a transmission mechanism through which the adjusting rod is connected to the support rod. The adjusting rod, after rotating around a first axis, drives the support rod to rotate around a second axis through the operation of transmission mechanism. The coordination between the support rod, adjusting rod, and the transmission mechanism can, without the direct rotation of support rod, drive the support rod to rotate by rotating the adjusting rod. Compared to directly rotating the support rod, the present disclose provides a more convenient microphone adjustment apparatus that can effectively reduce harm to the wrist of an operator.

10 Claims, 5 Drawing Sheets

MICROPHONE ADJUSTMENT APPARATUS AND RECORDING STRUCTURE

CROSS-REFERENCE TO RELATED APPLICATIONS

The present Application for Patent claims priority to and the benefit of pending Chinese Utility Model application No. 202321382488X, filed Jun. 1, 2023, and hereby expressly incorporated by reference herein as if fully set forth below in its entirety and for all applicable purposes.

TECHNICAL FIELD

The present disclosure relates to the field of microphone equipment, in particular to a microphone stand and recording structure.

INTRODUCTION

The sound reception or collection mode (or method) commonly available in the market connects a recording microphone (a device often used in shooting or filming) to one end of a support rod, and the operator holds the other end of the support rod with both hands to keep the microphone close to the target. To adjust the direction of microphone to listen to different targets, the operator has to rotate the support rod around its axis frequently to orient the recording microphone towards different subjects. This operating mode/method could easily cause injury to the wrist of the operator because the operator needs to twist the wrist forward and backward frequently in order to adjust the microphone.

As disclosed in a prior patent, a recording microphone for radio and television (Chinese application number CN201821297949.2) includes a support rod, one end of which is movably connected to a telescopic rod, one end of the telescopic rod is inserted into the interior of the support rod, and the other end of the telescopic rod far from the support rod is flexibly connected with a rotating connection port. The interior of the rotating connection port is fixedly connected to a connecting shaft, the outer surface of the connecting shaft is sleeved with a movable rod fixing clip, and the front of the movable rod fixing clip is fitted with screws. Such microphone still has the shortcomings of the prior art mentioned above.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

In order to solve the above problem, the present disclosure aims to provide a microphone adjustment apparatus that facilitates the adjustment of the microphone angle, orientation, and/or position, and can effectively reduce injury to the wrist of a user of the apparatus.

In order to achieve the above object, the technical schemes of the present disclosure are as follows.

A microphone adjustment apparatus includes a support rod, an adjustment rod, and a transmission mechanism. The microphone is carried by the support rod, and when the adjustment rod is rotated, the transmission mechanism drives the support rod to rotate, so as to adjust the angle, orientation, and or position of the microphone disposed on the support rod.

A recording apparatus comprises a microphone, a recording device, and a microphone adjustment apparatus. The microphone is disposed in a mounting position, and the recording device is electrically connected to the microphone. The microphone is used for reception of sound or audio, and the recording equipment is used for recording the voice or sound received by the microphone. During use, when the adjustment rod is being rotated or turned, the support rod can be driven to rotate by the transmission mechanism to adjust the angle, orientation, and/or position of the microphone.

The present disclosure has the advantages: the coordination between the support rod, adjustment rod, and the transmission mechanism can, without the direct rotating the support rod by the user, drive the support rod to rotate by rotating the adjusting rod. Compared to directly rotating the support rod, the disclosure provide more convenient techniques and operating mode that can effectively reduce harm to the wrist of a user.

BRIEF DESCRIPTION OF THE DRAWINGS

In order to more clearly illustrate aspects of the present disclosure or the technical schemes in the prior art, the drawings used in the description of exemplary embodiments will be briefly introduced below. Obviously, the drawings in the following description are only examples of the present disclosure. For those ordinarily skilled in the art, other implementations can be obtained according to the structures shown in these drawings.

DETAILED DESCRIPTION

In order to make the object, technical schemes, and advantages of the present disclosure clearer, the present disclosure will be further described in detail with reference to the accompanying drawings and exemplary embodiments. It should be understood that the specific embodiments described here are intended for illustrating the present disclosure, but not for limiting the present disclosure.

Figure 1:
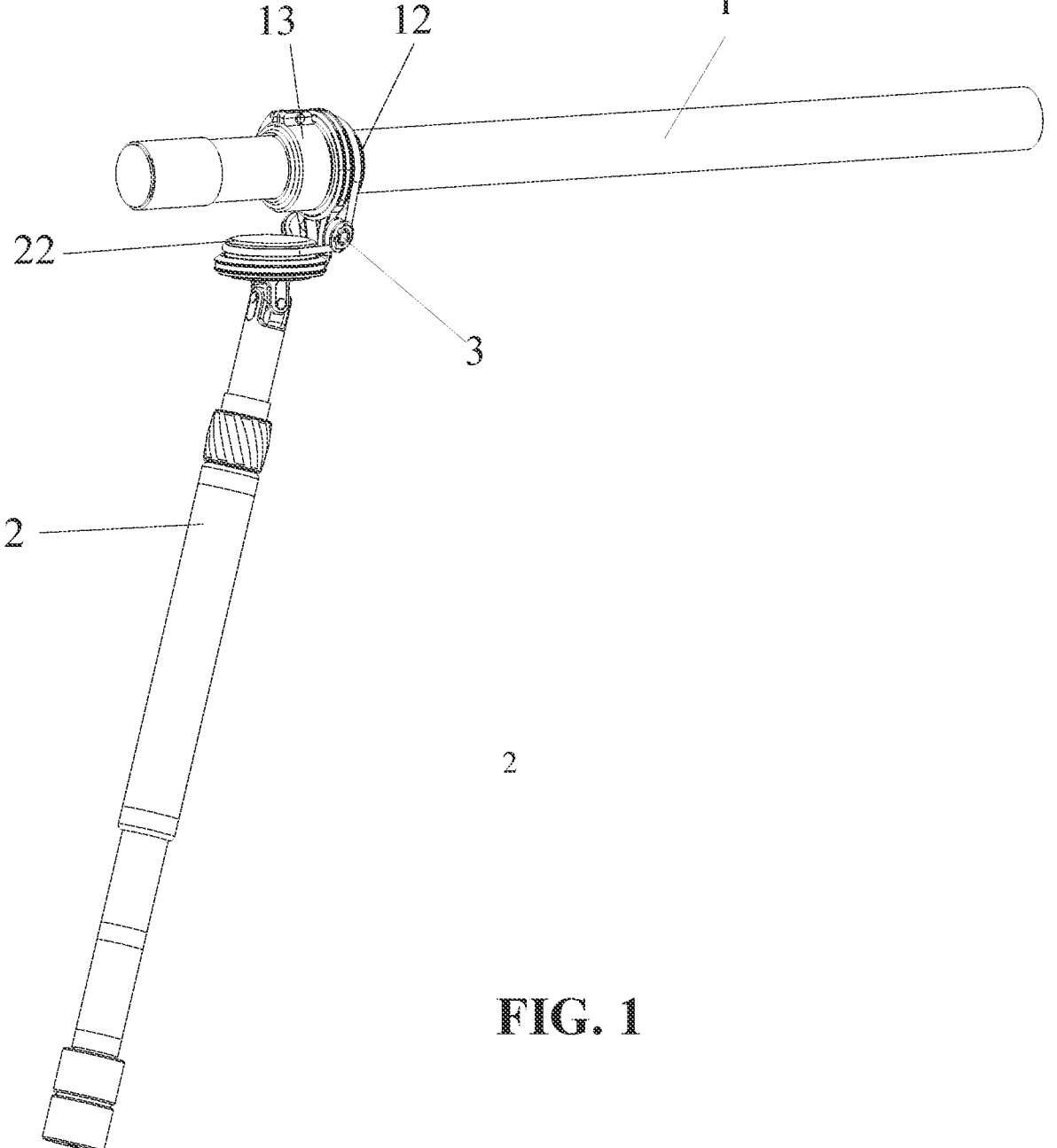
FIG. 1 is a schematic diagram of a microphone adjustment apparatus according to some aspects of the present disclosure.
Figure 2:
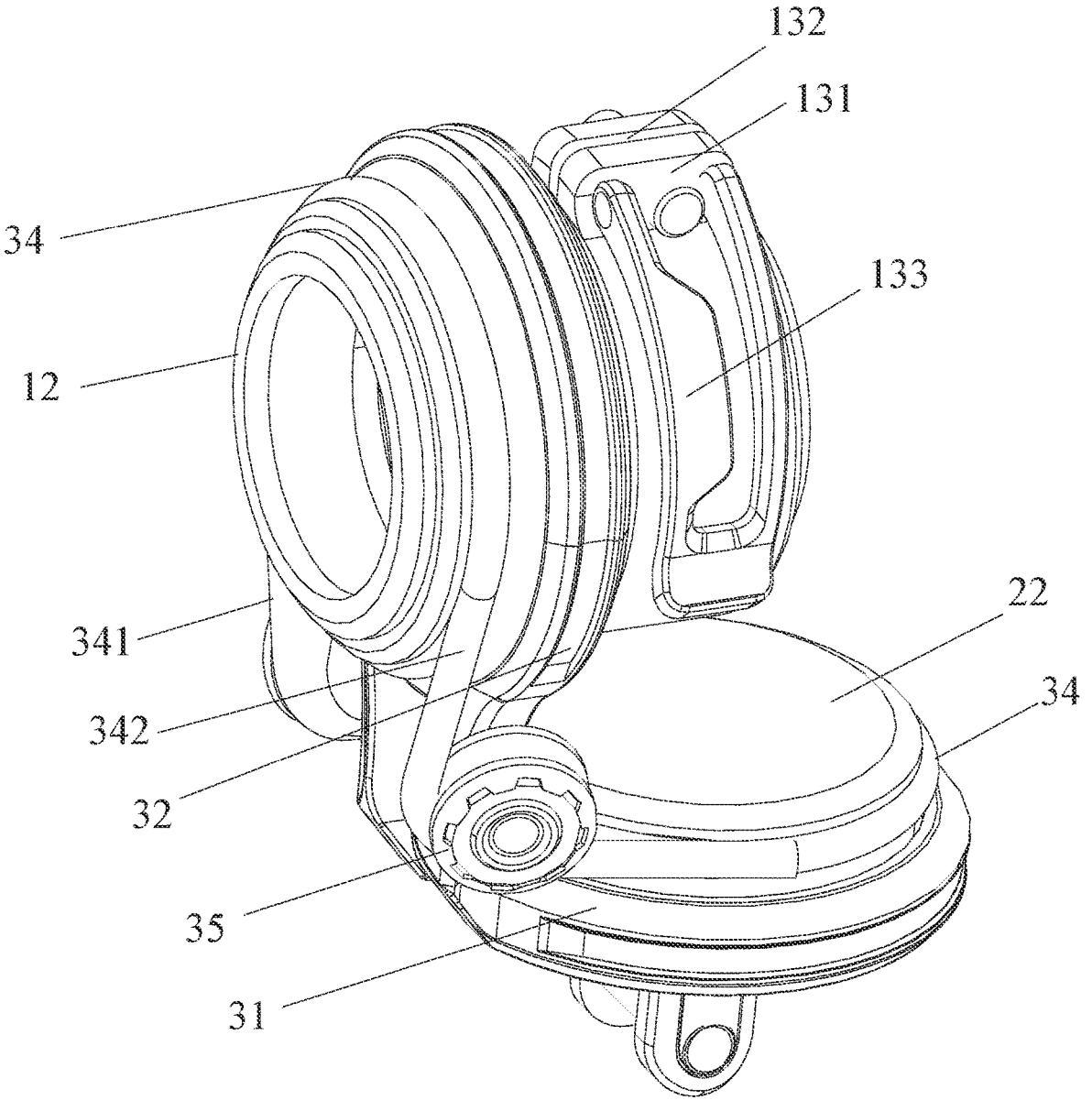
FIG. 2 is a schematic diagram of a first view of a transmission mechanism according to some aspects of the present disclosure.
Figure 3:
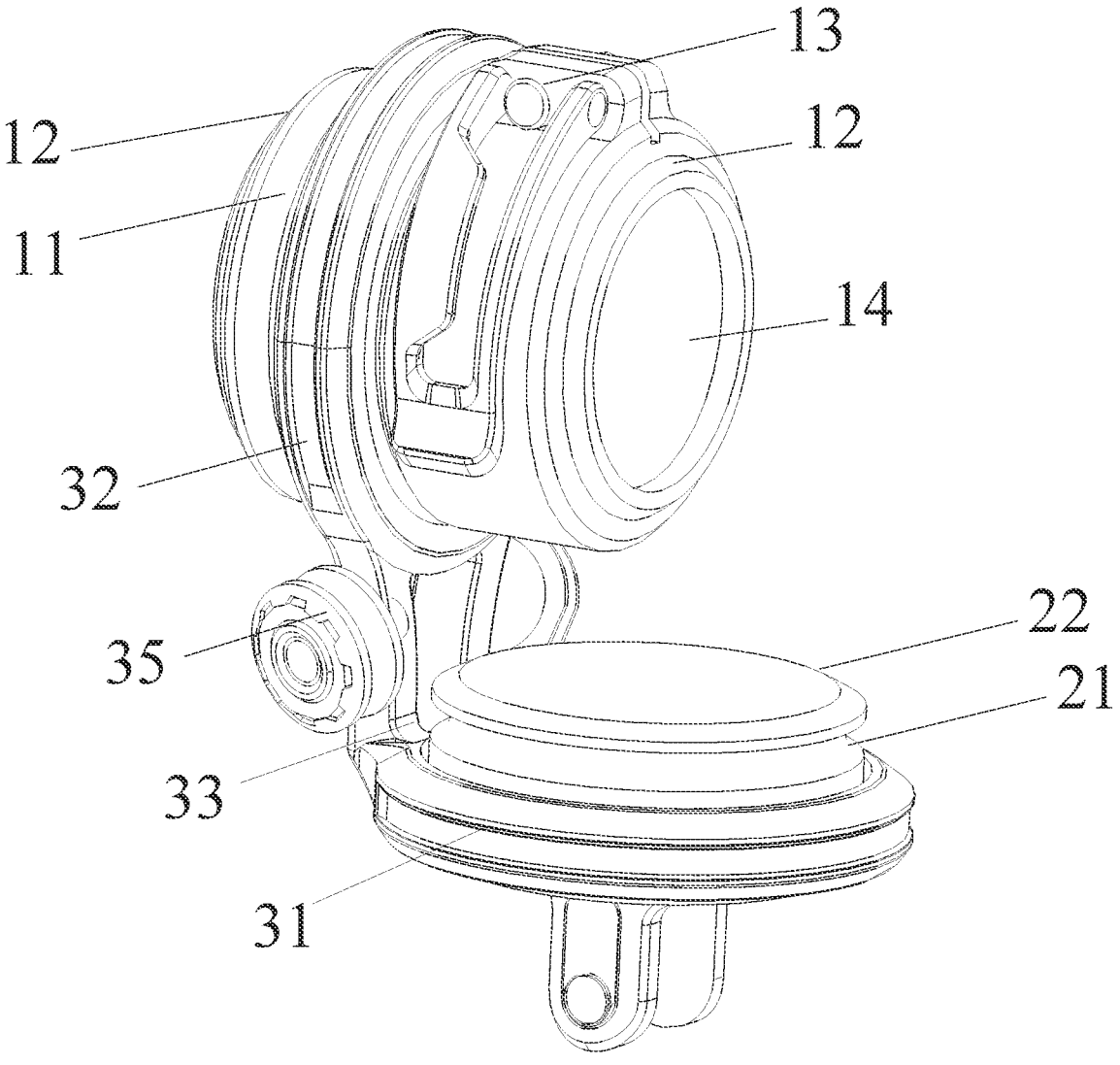
FIG. 3 is a schematic diagram of a second view of the transmission mechanism according to some aspects of the present disclosure.
Figure 4:
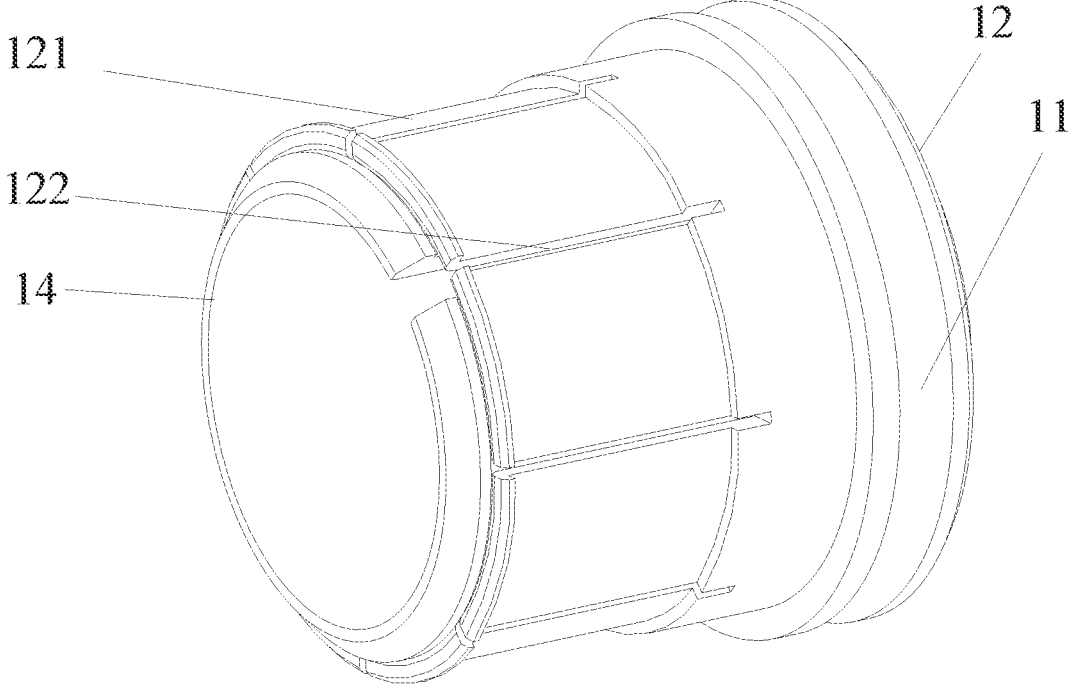
FIG. 4 is a schematic diagram of a connecting part and a washer according to some aspects of the present disclosure.
Figure 5:
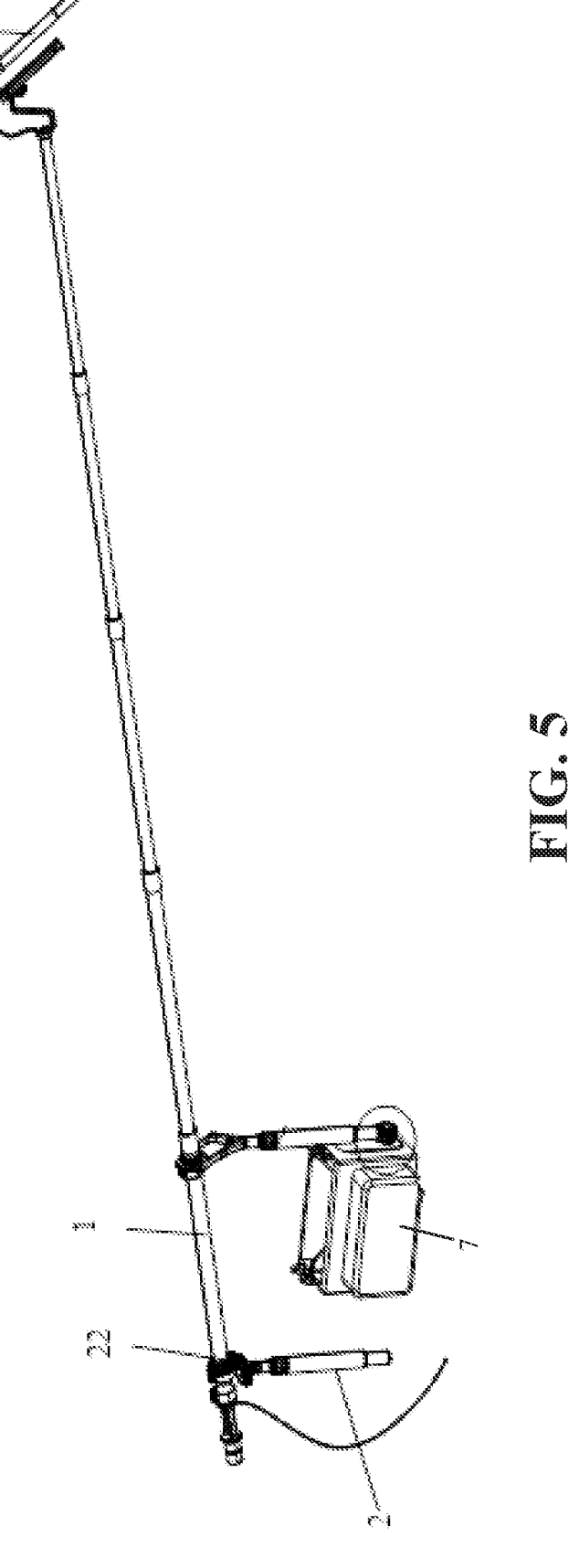
FIG. 5 is a schematic diagram of a recording apparatus according to some aspects of the present disclosure.

Referring to FIGS. 1 to 5, an embodiment provides a microphone adjustment apparatus comprising a support rod 1 and an adjustment rod 2. The support rod 1 is provided with a mounting position for microphone installation, and the mounting position can be an existing structure or apparatus for microphone installation. The adjustment rod 2 is provided with a handheld position for holding purpose (i.e., holding the adjustment rod 2), where can be held by the user's palm. The microphone adjustment apparatus also includes a transmission mechanism 3, through which the adjustment rod 2 can be connected to the support rod 1. The adjustment rod 2 can be rotated around its axis (e.g., an axis along the length direction of the adjustment rod 2) to drive the support rod 1 to rotate around its axis (e.g., an axis along the length direction of the support rod 1) through the transmission mechanism 3. To adjust the angle (e.g., twist angle) of support rod 1, the adjustment rod 2 can be rotated, for example, by hand. After rotation, the adjustment rod 2 drives the support rod 1 to rotate around its axis through the transmission mechanism 3, thus thereby controlling the angle position of a microphone mounted on the support rod 1. This feature enables the apparatus to achieve directional adjustment of the recording microphone while minimizing strain on the operator's wrist.

In an embodiment, the transmission mechanism 3 includes a transmission frame body and a transmission component. The transmission frame body includes a first connecting portion 31 and a second connecting portion 32. The first connecting portion 31 is connected (e.g., integrally connected) with the second connecting portion 32. An angle 33 is formed at their connection. The first connecting portion 31 is rotatably connected to the adjustment rod 2. The second connecting portion 32 is rotatably connected to the support rod 1. The adjusting rod 2 is connected to the support rod 1 through a transmission component.

In an embodiment, the first connecting portion 31 and the second connecting portion 32 both include respective circular structures. The first connecting portion 31 can be rotatably sleeved on the adjustment rod 2, and the second connecting portion 32 can be rotatably sleeved on the support rod 1.

In an embodiment, the angle 33 between the first connection portion 31 and the second connecting portion 32 can be a right angle. When the angle 33 is set as a right angle, the adjustment rod 2 in a vertical state relative to the support rod 1 which is being horizontally placed during use, allowing a more convenient adjustment of the adjusting rod 2.

In an embodiment, the transmission component comprises a transmission rope 34, and two pulleys 35 that are movably arranged on both sides (e.g., left and right sizes) of the first connecting portion 31 or of the second connecting portion 32. Two ends of the transmission rope 34 are sleeved (or wrapped) on the support rod 1 and the adjustment rod 2, respectively. The two sides in the middle of the transmission rope 34 are sleeved (or wrapped) on the two pulleys 35, respectively. The two pulleys 35 guide the transmission rope 34, while allowing for rotation without interfering with the transmission of the transmission rope 34. Specifically, rotating the adjustment rod 2 will drive one end of the transmission rope 34 sleeved on it to move, so that the other end of the transmission rope 34 synchronously drives the support rod 1 to rotate, converting the rotation (e.g., vertical rotation) of adjustment rod 2 to horizontal rotation of the support rod 1.

The two ends of transmission rope 34 are respectively sleeved (e.g., wrapped) on the support rod 1 and the adjustment rod 2. Specifically, the transmission rope 34 includes a first rope part 341 and a second rope part 342. One end of the first rope part 341 is fixed to one end of the second rope part 342, and the fixation part is disposed on the adjustment rod 2. The other end of the first rope part 341 is fixed to the other end of the second rope part 342, and the fixation part is disposed on the support rod 1. The middle of the first rope part 341 and the second rope part 342 respectively pass through and are held on two pulleys 35.

In an embodiment, a first annular groove 21 is disposed on the adjustment rod 2 (or the first connecting portion 31 connected to the adjustment rod 2), and a second annular groove 11 is disposed on the support rod 1. One end of the transmission rope 34 is sleeved inside the first annular groove 21, and can be wound one or more times inside the first annular groove 21. The other end of the transmission rope 34 is sleeved inside the second annular groove 11, and can be wound one or more times inside the second annular groove 11. The setting of the first annular groove 21 and the second annular groove 11 provides a connection with increased stability between the transmission rope 34, and the adjustment rod 2 and support rod 1. One end of the transmission rope 34 can be wound one or more times inside the first annular groove 21, while the other end of the transmission rope 34 can be wound one or more times inside the second annular groove 11 to increase the reliability of transmission rope 34.

In an embodiment, the upper end of the adjustment rod 2 is provided with a disc 22 (e.g., a turnplate) that is movably connected to the upper end of the adjusting rod 2 through a universal joint. The first connecting portion 31 is rotatably and movably connected to the outer side of disc 22. The fixation between one of the first rope part 341 and that of second rope part 342 is sleeved (or wrapped) on the disc 22 (turnplate).

In an embodiment, a bearing can be positioned between the first connecting portion 31 and the disc 22. The first annular groove 21 is located on the outer surface of the disc 22 and above the connection between the first connecting portion 31 and the disc 22. The arrangement of the universal joint can control the relative angle between the adjustment rod 2 and the support rod 1, and facilitate the use and control of the adjustment rod 2. For example, the adjustment rod 2 can be adjusted to change its tilt angle relative to the support rod 1.

In an embodiment, the microphone adjustment apparatus further includes a connecting assembly comprising a connecting part 12 and a locking member 13. The connecting part 12 can be flexibly sleeved on the support rod, the locking member 13 (locking part) is connected to the connecting part 12, locking the connecting part 12 on the support rod 1. The second connecting portion 32 can be rotatably sleeved on the outer side of the connecting part 12. The fixation between the other end of the first rope part 341 and that of the second rope part 342 is sleeved (or wrapped) on the connecting part 12. In one embodiment, a bearing can be arranged between the second connecting portion 32 and the connecting part 12. The second annular groove 11 is located on the outer surface of the connecting part 12, and the connection between the second connecting portion 32 and the connecting part 12 is located between the second annular groove 11 and the locking member 13. In one embodiment, the connecting part 12 is fixed on the support rod 1 by the locking member 13. The rotation can be controlled by the adjustment rod 2, and the adjustment rod 2 drives the connecting part 12 to rotate through the transmission rope 34, so that the connecting part 12 drives the support rod 1 to rotate, converting the rotation (e.g., vertical rotation) of adjustment rod 2 to the rotation (e.g., horizontal rotation) of the support rod 1.

In an embodiment, one end of the connecting part 12 is fitted with a clamping part 121, where multiple bar-shaped grooves (or slots) 122 are provided to make the clamping part 121 deformable. For example, the bar-shaped groove 122 can run through the upper and lower sides of clamping part 121 and the other end of clamping part 121. The locking component 13 includes a clamping ring 131 (e.g., FIG. 2) that is provided with a clamping opening 132, and the clamping opening 132/clamping ring 131 is movably provided with a clamping wrench 133 to adjust the opening and closing of clamping opening 132. The clamping ring 131 can be sleeved on the clamping part 121 and can clamp the clamping part 121 tightly on the support rod 1. The opening and closing of clamping opening 132 can be adjusted by the movable clamping wrench 133 to control whether the clamping ring 131 is clamped on the clamping part 121 or not. The arrangement of bar-shaped groove 122 enables the other end of clamping part 121 to be deformed when being clamped by the clamping ring 131, thus clamping and locking on the support rod 1.

In an embodiment, the clamping part 121 corresponding to the support rod 1 can be sleeved with a washer 14, and the clamping part 121 is sleeved and held against the outer side of the washer 14. The arrangement of the washer 14 can not only avoid wear between the connecting part 12 and the support rod 1, but also increase the friction force between the support rod 1 and the connecting part 12, so that the rotation of the connecting part 12 can stably drive the support rod 1 to rotate. In one embodiment, the washer 14 can be an open washer 14 for fitting support rod 1 of different sizes. The apparatus can provide washers (e.g., washer 14) of different sizes to adapt to support rods of different diameters.

Some embodiments can provide a recording apparatus, wherein the recording apparatus includes a microphone 5, a recording device 6, and a microphone adjustment structure 7 providing a mounting position for the microphone. The microphone 5 can be detachably clamped at the mounting position, and the recording device 6 is electrically connected (wired or wireless connection) to the microphone 5. In one example, the recording device 6 can be a photographic device (e.g., camera) with recording function, or a sound recorder.

The above are only the exemplary embodiments of the present disclosure and are not intended to limit the present disclosure. Any modification, equivalent substitution and improvement made within the spirit and principle of the present disclosure should fall within the protection scope of the present disclosure.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A microphone adjustment apparatus for a microphone, comprising:

a support rod providing a mounting position configured to hold the microphone;

an adjustment rod; and a transmission mechanism connecting the adjustment rod to the support rod, the transmission mechanism configured to drive the support rod to rotate around a first axis along a length direction of the support rod in response to a rotation of the adjustment rod around a second axis along a length direction of the adjustment rod, wherein the transmission mechanism comprises:

a transmission rope; and a first pulley and a second pulley, a first end of the transmission rope being sleeved on the support rod, and a second end of the transmission rope being sleeved on the adjustment rod, and a first side in a middle portion of the transmission rope being sleeved on the first pulley, and a second side in the middle portion of the transmission rope being sleeved on the second pulley.

2. The microphone adjustment apparatus according to claim 1, wherein the transmission mechanism comprises a transmission frame body and a transmission component, the transmission frame body comprising a first connecting portion and a second connecting portion, the first connecting portion connected to the second connecting portion forming an angle at the connection between the first connecting portion and the second connecting portion, the first connecting portion being rotatably connected to the adjustment rod, the second connecting portion being rotatably connected to the support rod, and the adjustment rod being connected to the support rod through the transmission mechanism.

3. The microphone adjustment apparatus according to claim 2, wherein the first connecting portion comprises a first circular structure, the first connecting portion being rotatably sleeved on the adjustment rod, wherein the second connecting portion comprises a second circular structure, the second connecting portion being rotatably sleeved on the support rod.

4. The microphone adjustment apparatus according to claim 3, wherein the first pulley and the second pulley are movably arranged on respective sides of the first connecting portion or the second connecting portion.

5. The microphone adjustment apparatus according to claim 4, wherein the transmission mechanism provides a first annular groove disposed on the support rod, and a second annular groove disposed on the adjustment rod, the first end of the transmission rope being sleeved in the first annular groove, and being wound one or more times in the first annular groove, a second end of the transmission rope being sleeved in the second annular groove, and being wound one or more times in the second annular groove.

6. The microphone adjustment apparatus according to claim 2, wherein the transmission mechanism further comprises a turnplate that is movably connected to a first end of the adjustment rod through a universal joint, the first connecting portion being rotatably and movably connected to the turnplate.

7. The microphone adjustment apparatus according to claim 2, further comprising:

a connecting assembly comprising a connecting part and a locking part, the connecting part being flexibly sleeved on the support rod, the locking part being connected to the connecting part, and configured to lock the connecting part on the support rod, the locking part can be rotatably and flexibly connected to the connecting part, and the adjustment rod being connected to the connecting part through the transmission mechanism.

8. The microphone adjustment apparatus according to claim 7, wherein a first end of the connecting part comprises a plurality of grooves configured to enable the connecting part to be deformable, the plurality of grooves extending through an outer side and an inner side of connecting part, and wherein the locking part comprises a clamping ring that is provided with a clamping opening, and a clamping wrench movably connected to the clamping ring to adjust the opening and closing of clamping opening, the clamping ring being sleeved on the connecting part to clamp the connecting part on the support rod.

9. The microphone adjustment apparatus according to claim 8, wherein the locking part further comprises a washer that is sleeved on the support rod, and the locking part is sleeved and held against an outer side of the washer.

10. A recording apparatus comprises a microphone, a recording device, and a microphone adjustment apparatus as claimed in claim 1, the microphone being arranged in a mounting position, and the recording device being electrically connected to the microphone.

* * * * *